US012643050B2

(12) United States Patent
Na et al.

(10) Patent No.: US 12,643,050 B2
(45) Date of Patent: *Jun. 2, 2026

(54) REDUCING LATENCY IN ANTICHEAT DATAFLOW

(71) Applicant: Niantic, Inc., San Francisco, CA (US)

(72) Inventors: Piaw Na, Los Altos, CA (US); Savitha Kayarat Jayasankar, Zürich (CH)

(73) Assignee: Niantic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/932,693

(22) Filed: Oct. 31, 2024

(65) Prior Publication Data

US 2025/0050229 A1     Feb. 13, 2025

Related U.S. Application Data

(63) Continuation of application No. 17/866,282, filed on Jul. 15, 2022, now Pat. No. 12,168,179.

(Continued)

(51) Int. Cl.
    *A63F 13/75*         (2014.01)
    *A63F 13/216*        (2014.01)
    (Continued)

(52) U.S. Cl.
    CPC ............ *A63F 13/75* (2014.09); *A63F 13/216* (2014.09); *A63F 13/358* (2014.09); *A63F 13/73* (2014.09);
    (Continued)

(58) Field of Classification Search
    CPC ...... A63F 13/216; A63F 13/35; A63F 13/358; A63F 13/73; A63F 13/75; A63F 13/79;
    (Continued)

(56) References Cited

U.S. PATENT DOCUMENTS 10,277,489 B2    4/2019  Hosie et al.
11,687,530 B2 *  6/2023  Krishna ................ A63F 13/216
                                                        707/718

(Continued)

FOREIGN PATENT DOCUMENTS

KR    10-2019-0108512 A    9/2019

OTHER PUBLICATIONS

Australian Intellectual Property Office, Office Action, Australian Patent Application No. 2022312218, Sep. 2, 2025, five pages.

(Continued)

*Primary Examiner* — William H Mcculloch, Jr.

(74) *Attorney, Agent, or Firm* — Fenwick & West LLP

(57)            ABSTRACT

Systems and methods for generating and storing metrics are described herein. In particular, a game server may receive game activity data from one or more client devices connected to the game server via a network. The game server sends the activity data to an anticheat server that uses one or more nodes to each calculate a portion of the activity data to generate one or more metrics. The metrics may indicate whether the data is indicative of cheating behavior within a parallel reality game. The nodes add their respective generated metrics to a relational database using prepared insert statements. The anticheat server may instruct the game server to take action with respect to one or more client devices if the metrics indicate that cheating behavior was exhibited within the data.

20 Claims, 8 Drawing Sheets

Related U.S. Application Data

(60) Provisional application No. 63/222,919, filed on Jul. 16, 2021.

(51) Int. Cl.
| | |
|---|---|
| *A63F 13/358* | (2014.01) |
| *A63F 13/73* | (2014.01) |
| *A63F 13/79* | (2014.01) |

(52) U.S. Cl.
CPC ........ *A63F 13/79* (2014.09); *A63F 2300/534* (2013.01); *A63F 2300/5546* (2013.01); *A63F 2300/5586* (2013.01)

(58) Field of Classification Search
CPC ............... A63F 13/86; A63F 2300/534; A63F 2300/5546; A63F 2300/5586
See application file for complete search history.

(56) References Cited

U.S. PATENT DOCUMENTS

| | | | | |
|---|---|---|---|---|
| 12,141,141 | B2 * | 11/2024 | Krishna | A63F 13/216 |
| 12,168,179 | B2 * | 12/2024 | Na | A63F 13/216 |
| 2005/0015356 | A1 | 1/2005 | Ireland et al. | |
| 2019/0026151 | A1 | 1/2019 | Ruiz et al. | |
| 2020/0001180 | A1 | 1/2020 | Turner et al. | |
| 2021/0058468 | A1 | 2/2021 | Yu | |
| 2021/0109935 | A1 | 4/2021 | Hsiao et al. | |
| 2023/0016152 | A1 * | 1/2023 | Na | A63F 13/79 |

OTHER PUBLICATIONS

European Patent Office, Extended European Search Report and Opinion, European Patent Application No. 22841600.4, May 19, 2025, nine pages.

Maxime et al., "Towards a scalable refereeing system for online gaming", Multimedia Systems, vol. 20, No. 5, Feb. 7, 2014, pp. 579-593.

Paraschos et al., "Parallel evaluation of conjunctive queries", Low Power Electronics And Design, Acm, 2 Penn Plaza, Suite 701 New York Ny, Jun. 13, 2011, pp. 223 234.

Stensland et al., "Cheat detection processing", Network And Systems Support For Games, Ieee Press, 445 Hoes Lane, Po box 1331, Pscataway, Nov. 16, 2010, pp. 1-6.

Trung et al., "Unsupervised Anomaly Detection in Online Game", Proceedings On The 6th International Symposium On Information And Communication Technology, Dec. 3, 2015, pp. 4-10.

Australian Intellectual Property Office, Office Action, Australian Patent Application No. 2022312218, Mar. 17, 2026, seven pages.

Na, P. et al., "Fault Tolerant Integration of Apache Beam with Relational Database", Proceedings of 2021 Beam Summit, Aug. 4-6, 2021, online conference, retrieved from the Internet on Mar. 16, 2026, <URL:https://2021.beamsummit.org/slides/a10-Fault-TolerantIntegration.pdf>.

* cited by examiner

500

Receive data from one or more client devices
510

Broadcast data to nodes
520

Calculate metrics at each node
530

Add metrics to a relational database
540

600

800

REDUCING LATENCY IN ANTICHEAT DATAFLOW

CROSS-REFERENCE TO RELATED APPLICATION

This application is a continuation of U.S. patent application Ser. No. 17/866,282, "Reducing Latency in Anticheat Dataflow" filed on Jul. 15, 2022, which claims priority under 35 U.S.C. § 119(e) to U.S. Provisional Patent Application No. 63/222,919, "Reducing Latency In Anticheat Dataflow," filed on Jul. 16, 2021, each of which is incorporated herein by reference.

BACKGROUND

1. Technical Field

The present disclosure relates to data processing, and, in particular, to processing data at nodes in a predetermined set and storing the data via the nodes.

2. Problem

Computer networks are interconnected sets of computing devices that exchange data. Exchanges of data may be made between computing devices and one or more servers for a number of applications, including augmented reality applications, where a high latency may affect the experience of users using the augmented reality applications. One or more servers may need to receive a large amount of data and calculate metrics based on the data to be used by an application within a given time period. Often, the one or more servers use a combiner in the calculations, which prevents the one or more servers from being able to store the data and metrics (or send the data and metrics to one or more computing devices) until all of the calculations have been completed. Further, the one or more servers may store the data in a database with limited dataflow or otherwise use the data with an interface (e.g. an Application Programming Interface) that is rate limited. Thus, there may be significant lag between the generation of data and calculation of the related metrics, which can be detrimental to the performance of the applications that rely on those metrics. Therefore, a system for calculating metrics and storing data with reduced latency is necessary.

SUMMARY

Various applications exist where it is desirable to process and store a large quantity of data within a limited time period. For example, in a parallel-reality game, an anticheat server may have only a limited time window (e.g., thirty minutes or less) to process a threshold batch amount (e.g., an hour's worth) of player activity data that comes in from a game server to identify activity data that is indicative of cheating. If the anticheat server takes longer than that to process the data, processing may not be completed until after the next batch's data becomes available. Thus, the anticheat server may either fall behind in processing or it may skip some activity data, leaving it unanalyzed. Using existing techniques, the anticheat server may need to wait until all data has been received before processing, and finish all of the processing before storing the processed data or passing it on to a system to take action.

This and other problems may be addressed by parallelizing nodes to independently calculate and store metrics during processing. If a database for storing metrics has a flow limit of a number of nodes that may write to the database at once, latency may be reduced by processing the data in parallel at independent nodes such that each node writes data to the database as it finishes processing rather than when all of the node shave finished processing.

In various embodiments, a method for processing data includes an anticheat server receiving data from one or more client devices. A data receiving module of the anticheat server broadcasts the data to a predetermined set of nodes, which may be included in the anticheat server or external to the anticheat server. In some embodiments, the data receiving module may broadcast the data using combine.globally.withfanout. Each node may process the data it receives to generate one or more metrics without waiting for the whole data set to be received. Each node may write to a relational database using prepared insert statements. In some embodiments, the relational database may be PostgreSQL.

In some embodiments, the data is activity data for players of a parallel reality game that is processed to identify potential cheating behavior. The anticheat server retrieves a list of identifiers for players of the parallel reality game by accessing a compressed data storage system (e.g., BigTable) via a range scan. The activity data is analyzed to calculate one or more metrics from the activity data associated with a player that indicate whether that player is likely to be cheating (e.g., spoofing their location). The anticheat server may retrieve activity data associated with identifiers in the list of identifiers. The anticheat server calculates a portion of the data at each node to generate one or more metrics. The metrics may indicate whether the data is indicative of cheating behavior performed by players during a parallel reality game.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Figure 7:
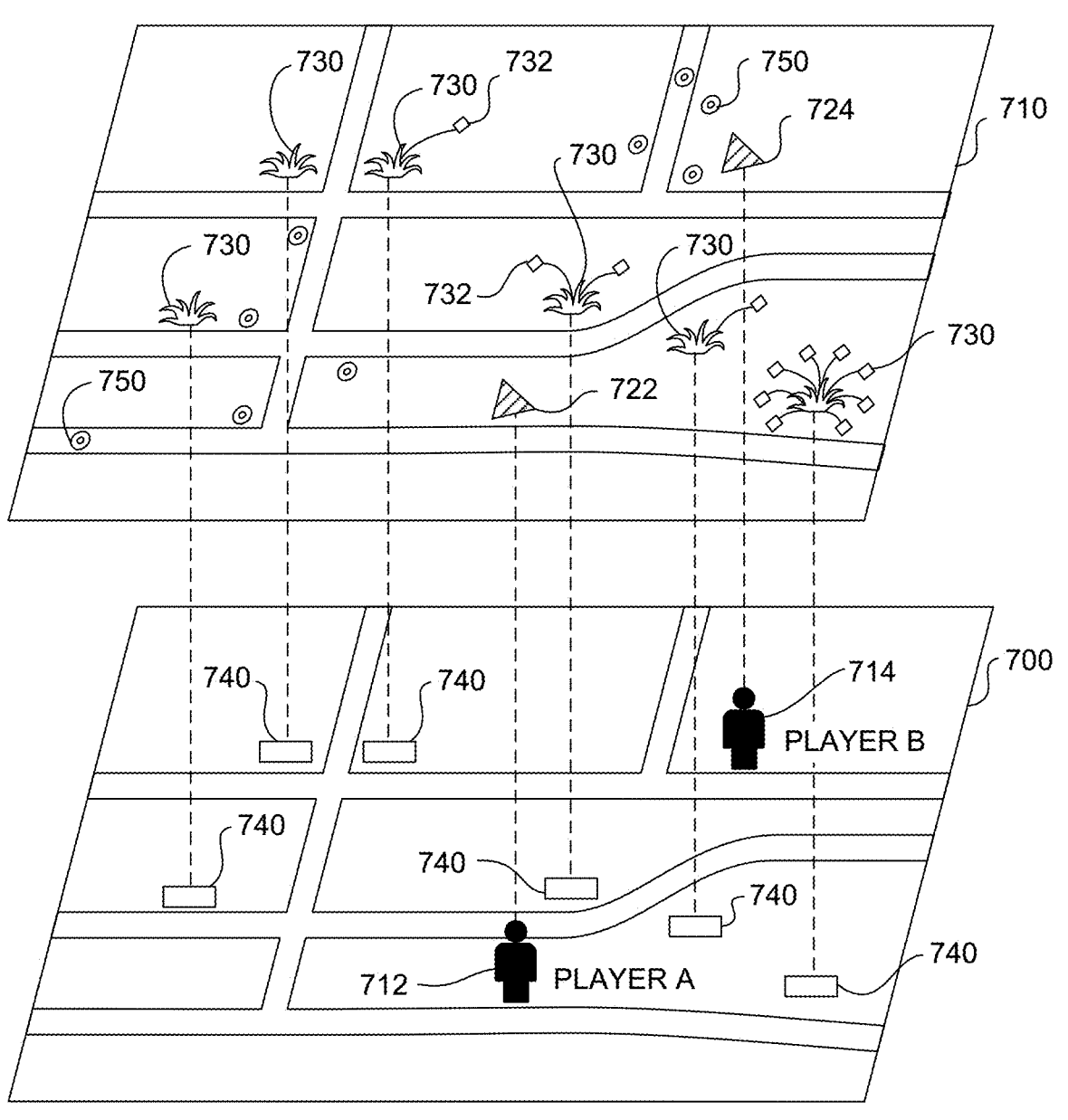
FIG. 7 depicts a representation of a virtual world having a geography that parallels the real world, according to one embodiment.
Figure 8:
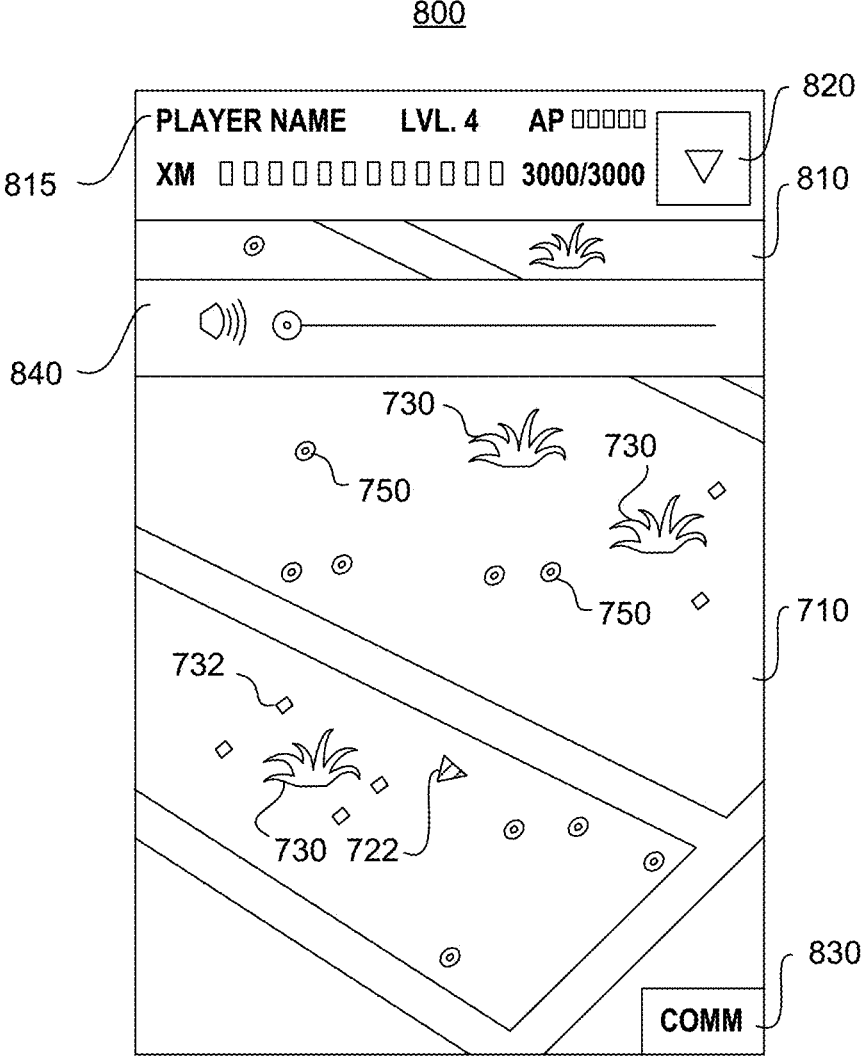
FIG. 8 depicts an exemplary game interface of a parallel reality game, according to one embodiment.

Various embodiments are described in the context of a parallel reality game that includes augmented reality content in a virtual world geography that parallels at least a portion of the real-world geography such that player movement and actions in the real-world affect actions in the virtual world (example parallel reality games are further described with respect to FIGS. 7-8). The subject matter described is applicable in other situations where generating and storing metrics is desirable. In addition, the inherent flexibility of computer-based systems allows for a great variety of possible configurations, combinations, and divisions of tasks and functionality between and among the components of the system.

Example Computing Environment

Figure 1:
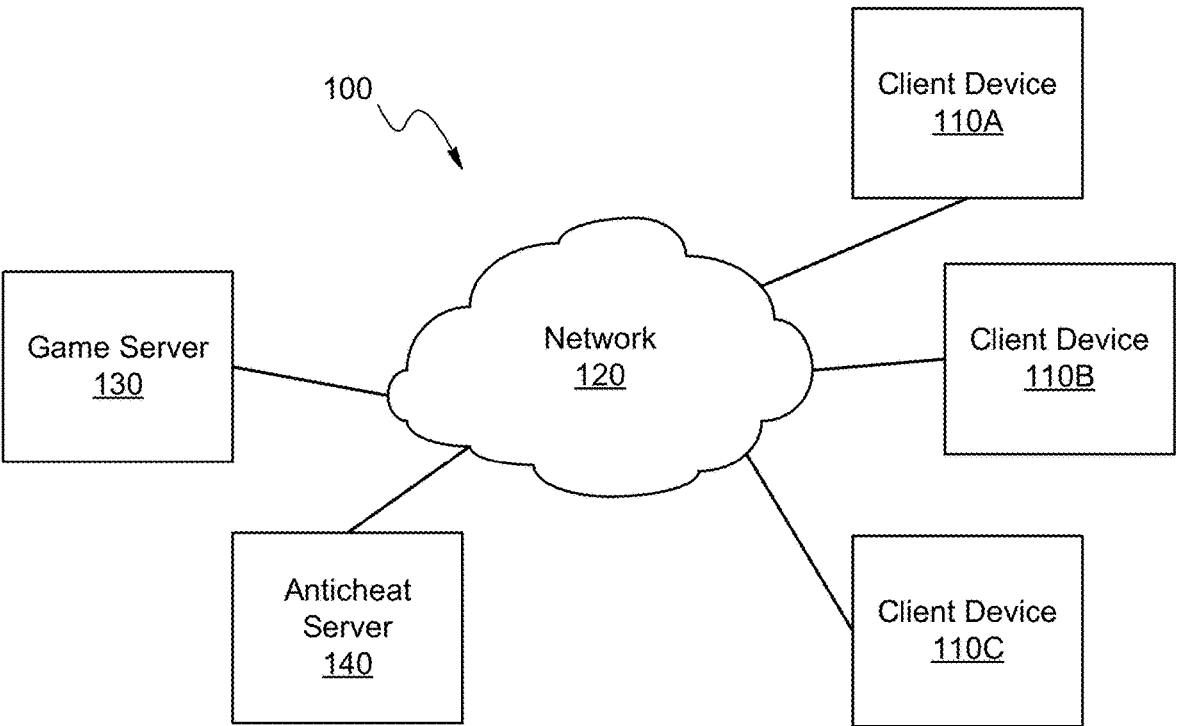
FIG. 1 is a block diagram of a networked computing environment suitable for generating and storing metrics for a parallel reality game, according to one embodiment.

FIG. 1 illustrates an environment 100 (also referred to as a computer network herein) for a game server 130, according to one embodiment. The figure illustrates a simplified example using block figures for purposes of clarity. The environment 100 includes three client devices 110, a network 120, a game server 130, and an anticheat server 140. The environment 100 includes a client-server architecture, where a game server 130 communicates with the client devices 110 over the network 120 to provide one or more parallel reality games to players at the client devices 110. In other embodiments, the environment 100 may include fewer, additional, or other components, such as sponsor/advertiser systems or business systems, additional client devices 110, networks 120, game servers 130, anticheat servers 140, or other network nodes. Furthermore, the functionalities of the components may be distributed in different manners than described below.

The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

The client devices 110 (also referred to as "clients") are computing devices with which players can interact with the game server 130. For instance, a client device 110 can be a smartphone, portable gaming device, tablet, personal digital assistant (PDA), cellular phone, navigation system, hand-held GPS system, or other such device. A client device 110 may execute software (e.g., a gaming application or app) to allow a player to interact with the virtual world. A client device 110 may also include hardware, software, or both for providing a user interface for a parallel reality game (also referred to as a location-based game herein). Furthermore, a client device 110 may be a vehicle with a built-in computing device. A client device is further described in relation to FIG. 2.

The network 120 can be any type of communications network, such as a local area network (e.g., intranet), wide area network (e.g., internet), or some combination thereof. The network 120 can also include a direct connection between a client device 110 and the game server 130. In general, communication between the game server 130 and a client device 110 can be carried via a network interface using any type of wired and/or wireless connection, using a variety of communication protocols (e.g., TCP/IP, HTTP, S1v1TP, FTP), encodings or formats (e.g., HTML, JSON, XML), and/or protection schemes (e.g., VPN, secure HTTP, SSL).

The game server 130 hosts a master state of the parallel reality game and provides game status updates to players' client devices 110 (e.g., based on actions taken by other players in the game, changes in real-world conditions, changes in game state or condition, etc.). The game server 130 receives and processes actions of players in the parallel reality game. The game server 130 may send the data to the anticheat server 140 for processing and receive information about measures to take in relation to players from the anticheat server 140. The game server 130 is further described in relation to FIG. 3.

The anticheat server 140 calculates and stores metrics based on data received from the game server 130 (or, in some embodiments, client devices 110). The anticheat server 140 may calculate and store metrics for a variety of systems and applications but is described herein for a parallel reality game (e.g., a shared AR environment in which players' locations in the real-world correlate with their positions in the game world). For instance, the anticheat server 140 receives data to store in a relational database. The data may be activity data describing actions that occurred in the parallel reality game. The metrics may relate to identifying activity data that is likely to correspond to cheating behavior in the parallel reality game. The anticheat server 140 employs a plurality of nodes to calculate metrics based on the data and to store the metrics as the calculations are completed. Distributing the calculation and storage in such a way allows the anticheat server 140 to reduce latency in calculating and storing the metrics. The anticheat server 140 is further described in relation to FIG. 4.

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Client Device

Figure 2:
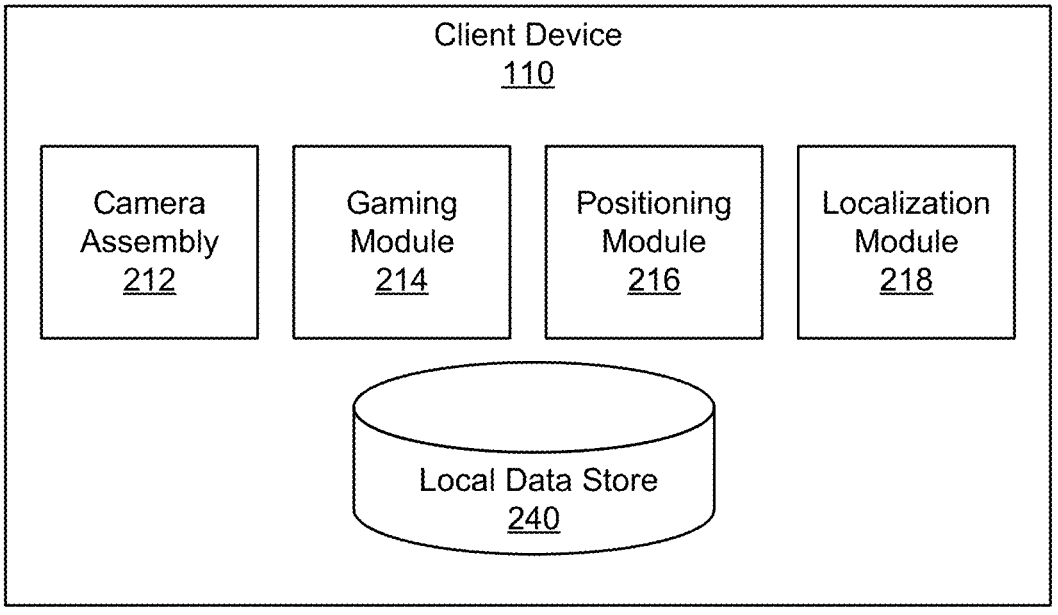
FIG. 2 is a block diagram illustrating a client device, according to one embodiment.

FIG. 2 is block diagram of a client device 110 shown in FIG. 1, according to one embodiment. Because the game server 130 may provide a location-based game, the client device 110 is preferably a portable computing device, such as a smartphone or other portable device, that can be easily carried or otherwise transported with a player. A player can interact with the virtual world simply by carrying or transporting the client device 110 in the actual world.

The client device 110 may communicate with the game server 130 to provide sensory data of a physical environment. In one embodiment, the client device 110 includes a camera assembly 212, a gaming module 214, a positioning module 216, a localization module 218, and a local data store 240. The client device 110 also includes a network interface (not shown) for providing communications over the network 120. In various embodiments, the client device 110 may include different or additional components, such as additional sensors, display, and software modules, etc.

The camera assembly 212 includes one or more cameras which can capture image data. The cameras capture image data describing a scene of the environment surrounding the client device 110 with a particular pose (the location and orientation of the camera within the environment). The camera assembly 212 may use a variety of photo sensors with varying color capture ranges and varying capture rates. Similarly, the camera assembly 212 may include cameras with a range of different lenses, such as a wide-angle lens or a telephoto lens. The camera assembly 212 may be configured to capture single images or multiple images as frames of a video.

The client device 110 may also include additional sensors for collecting data regarding the environment surrounding the client device, such as movement sensors, accelerometers, gyroscopes, barometers, thermometers, light sensors, microphones, etc. The image data captured by the camera assembly 212 can be appended with metadata describing other information about the image data, such as additional sensory data (e.g., temperature, brightness of environment, air pressure, location, pose etc.) or capture data (e.g., exposure length, shutter speed, focal length, capture time, etc.).

The client device 110 can include a positioning device 210 that monitors the position of the client device 110 in the real world. The positioning device 210 can be any device or circuitry for monitoring the position of the client device 110. For example, the positioning device 210 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The gaming module 214 provides a player with an interface to participate in the parallel reality game. The game server 130 transmits game data over the network 120 to the client device 110 for use by the gaming module 214 to provide a local version of the game to a player at locations remote from the game server. In one embodiment, the gaming module 214 presents a user interface on a display of the client device 110 that depicts a virtual world (e.g., renders imagery of the virtual world) and allows a user to interact with the virtual world to perform various game objectives. In some embodiments, the gaming module 214 presents images of the real world (e.g., captured by the camera assembly 212) augmented with virtual elements from the parallel reality game. In these embodiments, the gaming module 214 may generate or adjust virtual content according to other information received from other components of the client device 110. For example, the gaming module 214 may adjust a virtual object to be displayed on the user interface according to a depth map of the scene captured in the image data.

The gaming module 214 can also control various other outputs to allow a player to interact with the game without requiring the player to view a display screen. For instance, the gaming module 214 can control various audio, vibratory, or other notifications that allow the player to play the game without looking at the display screen.

The positioning module 216 can be any device or circuitry for determining the position of the client device 110. For example, the positioning module 216 can determine actual or relative position by using a satellite navigation positioning system (e.g., a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 110 in the real world, the positioning module 216 tracks the position of the player and provides the player position information to the gaming module 214. The gaming module 214 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 214 can provide player position information to the game server 320 over the network 120. In response, the game server 320 may enact various techniques to verify the location of the client device 110 to prevent cheaters from spoofing their locations. It should be understood that location information associated with a player is utilized only if permission is granted after the player has been notified that location information of the player is to be accessed and how the location information is to be utilized in the context of the game (e.g., to update player position in the virtual world). In addition, any location information associated with players is stored and maintained in a manner to protect player privacy.

The localization module 218 receives the location determined for the client device 110 by the positioning module 216 and refines it by determining a pose of one or more cameras of the camera assembly 212. In one embodiment, the localization module 218 uses the location generated by the positioning module 216 to select a 3D map of the environment surrounding the client device 110. The localization module 218 may obtain the 3D map from local storage or from the game server 320. The 3D map may be a point cloud, mesh, or any other suitable 3D representation of the environment surrounding the client device 110.

In one embodiment, the localization module 218 applies a trained model to determine the pose of images captured by the camera assembly 212 relative to the 3D map. Thus, the localization model 218 can determine an accurate (e.g., to within a few centimeters and degrees) determination of the position and orientation of the client device 110. The position of the client device 110 can then be tracked over time using dad reckoning based on sensor readings, periodic re-localization, or a combination of both. Having an accurate pose for the client device 110 may enable the game module 314 to present virtual content overlaid on images of the real world (e.g., by displaying virtual elements in conjunction with a real-time feed from the camera assembly 212 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

The local data store 240 is one or more computer-readable media configured to store data used by the client device 110. For example, the local data store 240 may store the player location information tracked by the positioning module 216, a local copy of the current state of the parallel reality game, or any other appropriate data. Although the local data store 240 is shown as a single entity, the data may be split across multiple media. Furthermore, data may be stored elsewhere (e.g., in a distributed database) and accessed remotely via the network 120.

Example Game Server

Figure 3:
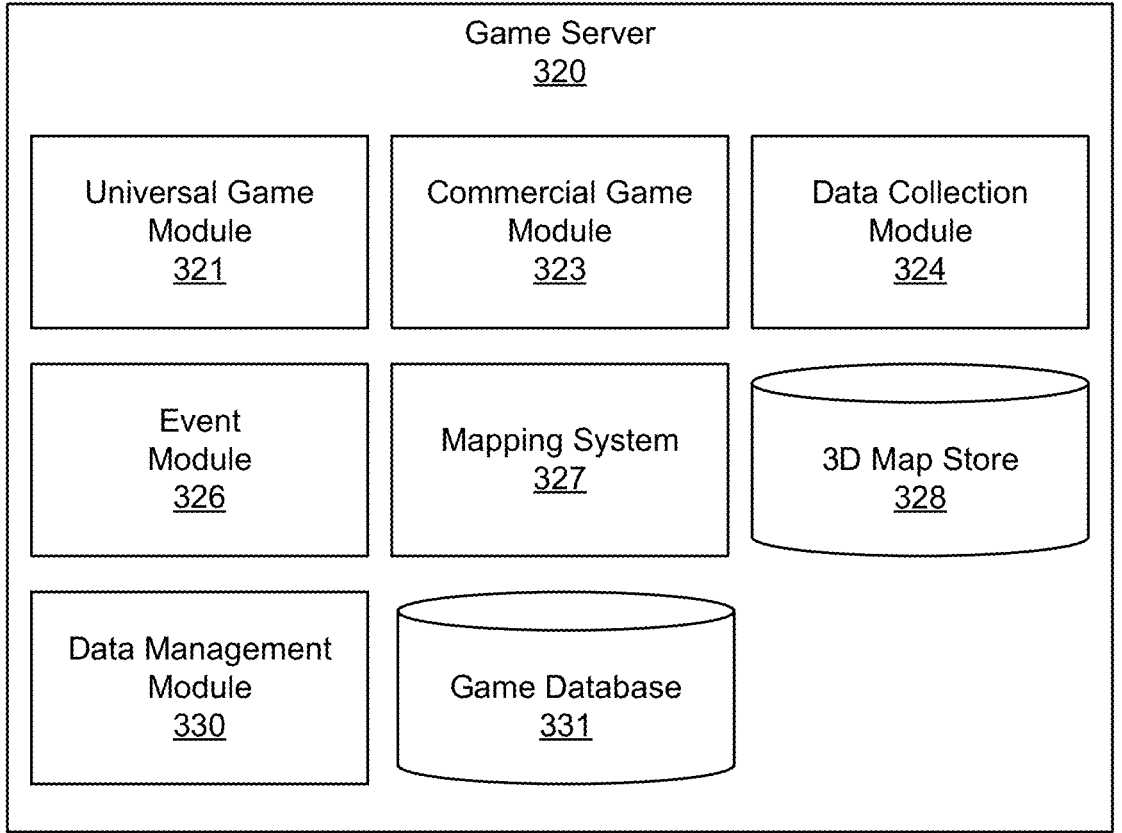
FIG. 3 is a block diagram illustrating a game server, according to one embodiment.

The game server 130 includes one or more computing devices that provide game functionality to the client devices 110. FIG. 3 illustrates one embodiment of the game server 130 suitable for hosting a parallel reality game. In the embodiment shown, the game server 130 includes a universal gaming module 321, a commercial game module 323, a data collection module 324, an event module 326, a mapping system 327, a 3D map store 328, a data management module 330 and a game database 331. In other embodiments, the game server 130 contains different or additional elements and may include modules for purposes of providing processing for applications and systems other than a parallel reality game. In addition, the functions may be distributed among the elements in a different manner than described.

The game database 331 may be part of the game server 320 or separate from the server 320 and accessed remotely (e.g., the game database 331 may be a distributed database accessed via the network 120). The game database 331 stores game data used in the parallel reality game to be served or provided to the client device 110 over the network 120. The game data stored in the game database 331 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game data stored in the game database 331 can be populated either offline or in real time by system administrators or by data received from users (e.g., players) of the system 300, such as from a client device 110 over the network 120.

The game server 130 can be configured to receive requests for game data from one or more client devices 110 (for instance, via remote procedure calls (RPCs)) and to respond to those requests via the network 120. The game server 130 can encode game data in one or more data files and provide the data files to a client device 110. In addition, the game server 130 can be configured to receive game data (e.g., player location, player actions, player input, etc.) from one or more client devices 110 via the network 120 and calculate metrics based on the game data. For instance, the client device 110 can be configured to periodically send player input, player location, and other updates to the game server 130, which the game server 130 uses to update game data in the game database 331 to reflect changed conditions for the game. The game server 130 may also send game data and calculated metrics to client devices 110.

The universal game module 321 hosts an instance of the parallel reality game for a set of players (e.g., all players of the parallel reality game) and acts as the authoritative source for the current status of the parallel reality game for the set of players. As the host, the universal game module 321 generates game content for presentation to players (e.g., via their respective client devices 310). The universal game module 321 may access the game database 331 to retrieve or store game data when hosting the parallel reality game. The universal game module 321 may also receive game data from client devices 310 (e.g., depth information, player input, player position, player actions, player status, landmark information, etc.) and incorporates the game data received into the overall parallel reality game for the entire set of players of the parallel reality game. The universal game module 321 can also manage the delivery of game data to the client device 110 over the network 120. In some embodiments, the universal game module 321 also governs security aspects of the interaction of the client device 110 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 321. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 120 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 321. The data collection module 324 can manage the inclusion of various game features within the parallel reality game that are linked with a data collection activity in the real world. For instance, the data collection module 324 can modify game data stored in the game database 331 to include game features linked with data collection activity in the parallel reality game. The data collection module 324 can also analyze data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 328. The 3D map may be stored in the 3D map store 328 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The data management module 330 can be separate from or a part of the data collection module 324. The data management module 330 communicates data to the anticheat server 140 for processing and receives measures determined by the anticheat server 140 to take if the data is indicative of cheating behavior, as is described in relation to FIG. 4. In particular, the data management module 330 receives data from one or more client devices 110, the game database 331, or other servers connected to the game server 130 via the network 120. The data may be activity data describing actions performed by players within the parallel reality game via the client devices 110 (e.g., actions the players have taken, times the actions were taken, how fast the player was moving when the actions were taken, etc.). In some embodiments, instead of automatically receiving the data, the data management module 330 may retrieve a list of identifiers for players of the parallel reality game (or the client devices 110 of the players) and may retrieve data associated with the identifiers in the list (e.g., from the relevant client devices 110 or the game database 331). In some embodiments, the data management module 330 may retrieve activity data associated with the identifiers by accessing, via a range scan, a compressed data storage system that stores the activity data in relation to identifiers. The compressed data storage system may be part of the game database 331 or may, in some embodiments, be BigTable or standard cloud storage. The data management module 330 sends the retrieved data to the anticheat server 140 to determine metrics and communicates with the anticheat server 140 regarding actions to be taken if the data is indicative of cheating behavior.

Example Anticheat Server

Figure 4:
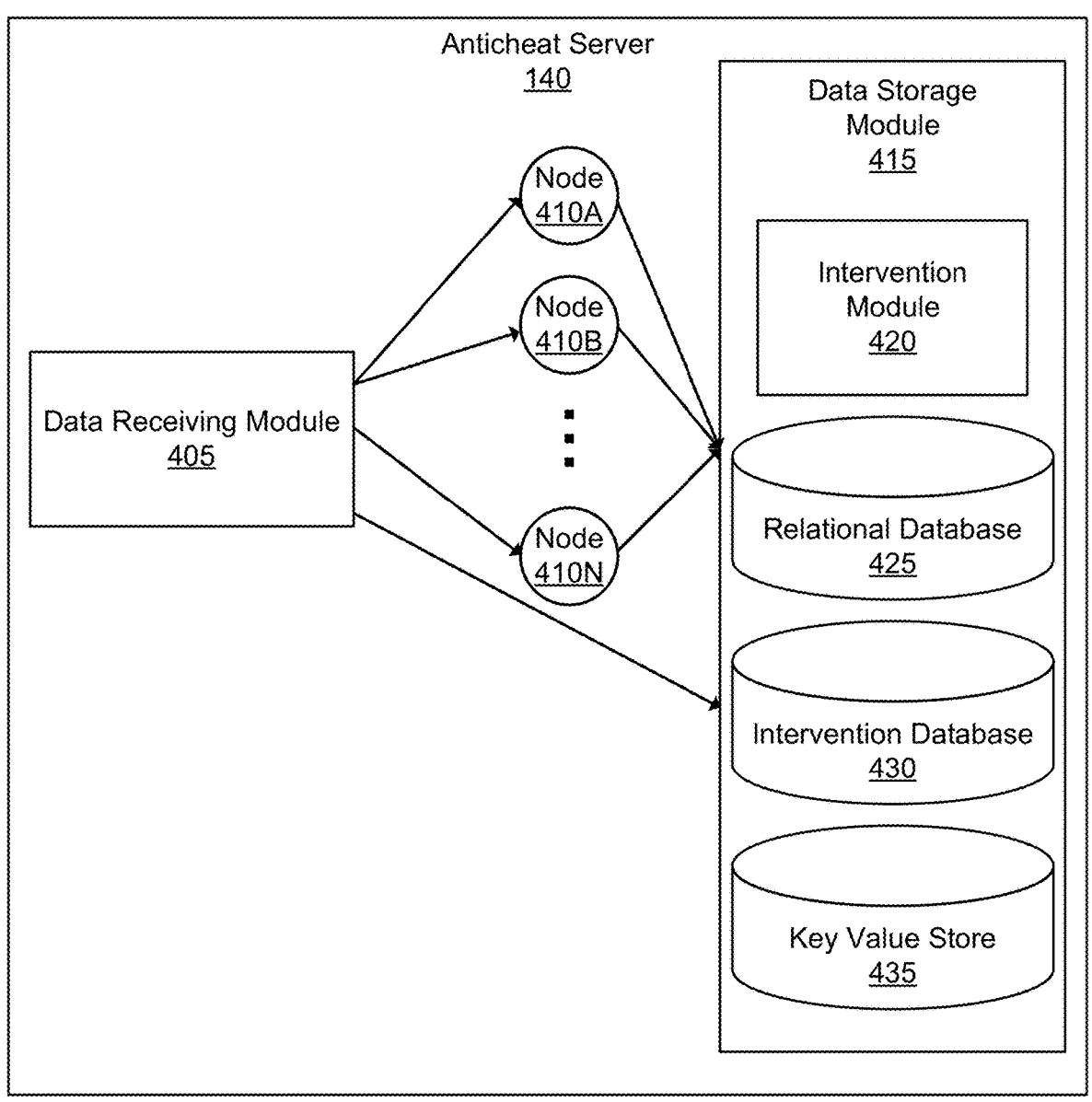
FIG. 4 is a block diagram illustrating an anticheat server, according to one embodiment.

FIG. 4 illustrates one embodiment of the anticheat server 140. The anticheat server 140 includes a data receiving module 405, a plurality of nodes 410 (labeled 410A, 410B . . . , 410N in FIG. 4), and a data storage module 415. The data storage module 415 includes an intervention module 420, a relational database 425, an intervention database 430, and a key value store 435. Although the anticheat server 140 is described and illustrated as a single server, it may be implemented using multiple servers. The anticheat server 140 may include fewer, additional, or other components than illustrated. In some embodiments, the nodes 410 may be external to the anticheat server 140, and the anticheat server 140 may communicate with the nodes 410 via the data receiving module 350 and data storage module 415.

The data receiving module 405 receives data from the game server 130 (e.g., the data management module 330) and analyzes the data to determine where to store the data or send the data for analysis. For data that indicates a local state of a client device 110, the data storage module 415 may write the data to the key value store 435. The data receiving module 405 may store the local state data with an identifier of the player (e.g., a user or player name) or client device 110 associated with the local state data and keep a running record of the data associated with each player and client device 110 in the key value store. In some embodiments, the key value store 435 includes transactional data about a player state. The key value store 435 may also include one or more of: (1) location history of a player or client device 110 for a period of time (e.g., location history for the last 30 days), (2) past and current measures applied to a player or client device 110, (3) information about a player's game sessions and the signals (e.g., data) generated for those sessions. Data of a player or client device 110 to be stored in the key value store 435 may be generated and transferred to the anticheat server 140 when a player is active in the game.

For data indicating actions of players (e.g., not data stored in the key value store 435), the data receiving module 405 may broadcast the data to one or more nodes 410. In some embodiments, the data receiving module 405 broadcasts data to the nodes 410 before receiving all of the data from the game server 130.

In some embodiments, the data receiving module 405 broadcasts the data using combine.globally.withfanout. Combine.globally.withfanout is a divide-and-conquer approach for distributed data processing. Generally, it may be used when a portion of data has more load than other portions of data. Thus, combine.globally.withfanout enables tuning of the processing of the uneven load distribution. Specifically, combine.globally.withfanout enables one to define a number of intermediate workers (e.g., nodes, sub nodes, or shards). These workers compute partial results. Once the intermediate nodes have completed the work assigned to them, the results may be sent to a final worker (e.g., a final node). The final worker is in charge of merging these results in a final combine step. Combine.globally.with-fanout may include a parameter that specifies the number of intermediary steps to do before the final computation.

In some embodiments, the data receiving module 405 may access a set of identifiers indicating which nodes 410 are in predetermined sets based on input from an external operator. For example, the data receiving module 405 retrieves a list of identifiers for players (e.g., user or player names or unique identifiers for players for each game session) of the parallel reality game by accessing a compressed data storage system (e.g., GCP BigTable or Apache HBase) via a range scan. The compressed data storage stores trackable information related to a player's game play. In some embodiments, all game play actions performed by a player are recorded and stored in the compressed data storage.

Additionally, or alternatively, to the set of nodes being based on the input from an external operator, the data receiving module 405 may determine a set of nodes 410 that have availability or capacity to analyze a respective subset of the data. In response to this, the data receiving module 405 may only broadcast the respective subsets of the data to nodes 410 in the determined set. For instance, if only ten of one hundred nodes 410 are available for processing, the data receiving module 405 may only send data to those ten nodes 410. In some instances, the data receiving module 405 may select between 24 and 200 nodes 410.

The data receiving module 405 may aggregate similar (or the same) types of data together and send the aggreged data to a single node. This helps prevent similar types of data being sent to different nodes 410. This may also help ensure that a node calculates a metric accurately. In some embodiments, a hash function is used to aggregated data similar types of data before it is sent to a node. In some embodiments, predetermined sets of nodes are designated to receive certain types of data.

As stated above, the anticheat server 140 uses the plurality of nodes 410 to calculate metrics based on the data received by the data receiving module 405. The anticheat server 140 may include any number of nodes 410. The nodes 410 are independent processing units that can receive, manipulate, generate, and communicate data. For example, a node (e.g., 410A) is a collection of processing resources, such as a CPU, a RAM, and storage. In some embodiments, the nodes 410 are spanner nodes of GOOGLE CLOUD SPANNER. In some embodiments, each node (or sets of nodes) write to the relational database 425 independently of each other (instead of the nodes doing all of the processing, aggregating the results, and then writing all the aggregated results to the relational database 425 at once).

Each node 410 uses received data to generate one or more metrics. Example metrics include: a cheating indicator or cheating signal, an event which generated the cheating indicator or signal, a client device brand, a background session ID, a timestamp when the cheating was detected, a session Type (e.g., foreground or adventure sync or fitness related session), or a client device OS version. The metrics may indicate which actions of players (described by the data) are indicative of cheating behavior within the parallel reality game. Actions that violate one or more rules of the parallel reality game (e.g., moving faster than a threshold speed, geographic location spoofing, etc.) are indicative of cheating behavior. In some embodiments, the nodes may use one or more machine-learning models trained to detect indications of cheating behavior in a set of data. Each machine learning model may output a likelihood (e.g., the metric) that the set of data is indicative of cheating behavior. If the likelihood is above a threshold value, the node may generate an indication of cheating behavior to be stored as a metric with the data.

In some embodiments, a node includes an accumulation layer that receives data from the data receiving module 405. After the accumulation layer receives a threshold amount of data, the node may begin calculating a metric. The threshold itself may depend on the type of data being received or the metric to be calculated. In some cases, the node may continue to receive new data after the threshold amount of data has been received. In these cases, the node may incorporate the newly received data into its calculations for determining the metric. Thus, a node may begin calculating a metric before it receives all of the relevant data for that metric. Among other advantages, this makes more efficient use of the node's processing time because it can start working (e.g., immediately) rather than waiting for the whole batch of data to be received.

As each node generates metrics based on the data received data, the nodes store the metrics in the relational database 425. As the name suggests, the relational database 425 is a relational database, such as a PostgreSQL database. Relational databases, provide many functionalities that is not available in non-relational databases. For example, a relational database may provide fault tolerance abilities that are unavailable in non-relational databases. However, relational databases may be rate limited for write operations, which may make it difficult to write large amounts of data at once to a relational database. Thus, allowing the nodes 410 to independently write data to relational database 425 at different times may allow large amounts of data to be written to the relational database 425. In some embodiments, the nodes 410 may store the metrics using prepared insert statements. A prepared insert statement is a feature that allows data to be repeatedly written without repeatedly re-compiling the write function. For example, a prepared statement takes the form of a pre-compiled statement (e.g., code) into which data values are substituted during each execution. In some embodiments, a prepared insert statement is created and filled with data ahead of time so that a final node doesn't need to perform extra computation. In some embodiments, the nodes 410 generate some data points regarding the number of prepared insert statements created. This data may also be stored to improve scalability of the anticheat server 140.

Employing the nodes 410 for metric calculation, as described herein, allows the anticheat server 140 to generate metrics and store the metrics in the relational database 425 as each node 410 completes its generation of metrics. Thus, a node may transmit a metric to the relational database 425 for storage without waiting for other nodes to complete their metric calculations. This may improve the efficiency of the metric calculations and storage. For example, due to flow limits, the relational database 425 may be unable receive metrics from all nodes at once. By having each node store a metric calculation when it is complete (instead of waiting for all of the other nodes), the flow limits of the relational database 425 may be respected. This may be useful for responding to flow-limited API calls or when making calls to flow-limited functions such that the flow limitations are respected without a significant increase in latency.

A metric in the relational database 425 may be time stamped. For example, a metric may have a time stamp corresponding to (a) when data of the metric was generated or (b) when a player performed an activity (in the parallel reality game) associated with the metric data. This backdating may help determine if cheating behavior occurred. The time stamps may be customizable for different applications or uses.

The intervention module 420 may determine if cheating behavior occurred and may determine measures to take against one or more players based on the metrics generated at the nodes. Measures may include sending a player a warning, banning a player from the parallel reality game for a time period, suspending a player permanently from the parallel reality game, or any other action taken based on cheating behavior being present in the data. The intervention module 420 may retrieve the metrics from the relational database 425 upon determining that one or more nodes have stored new metrics at the relational database 425. The intervention module 420 may compare the metrics to one or more thresholds and determine, based on the compared metrics, measures to take against the player associated with the metrics. In some embodiments, the intervention module 420 may also determine measures based on previous measures taken against the player and/or previous metrics calculated for the player. For example, the intervention module 420 may employ a "strike" system where each instance of cheating behavior detected for a player escalates the measures taken (e.g., first strike would result in a warning, second strike would result in a one-day ban, etc.).

The intervention module 420 stores the measures in the intervention database 430 in association with the player. The intervention module 420 may communicate with the game server 130 about the determined measures so that the game server 130 may enact such measures and may update the intervention database 430 to reflect when measures have been taken.

Example Method

Figure 5:
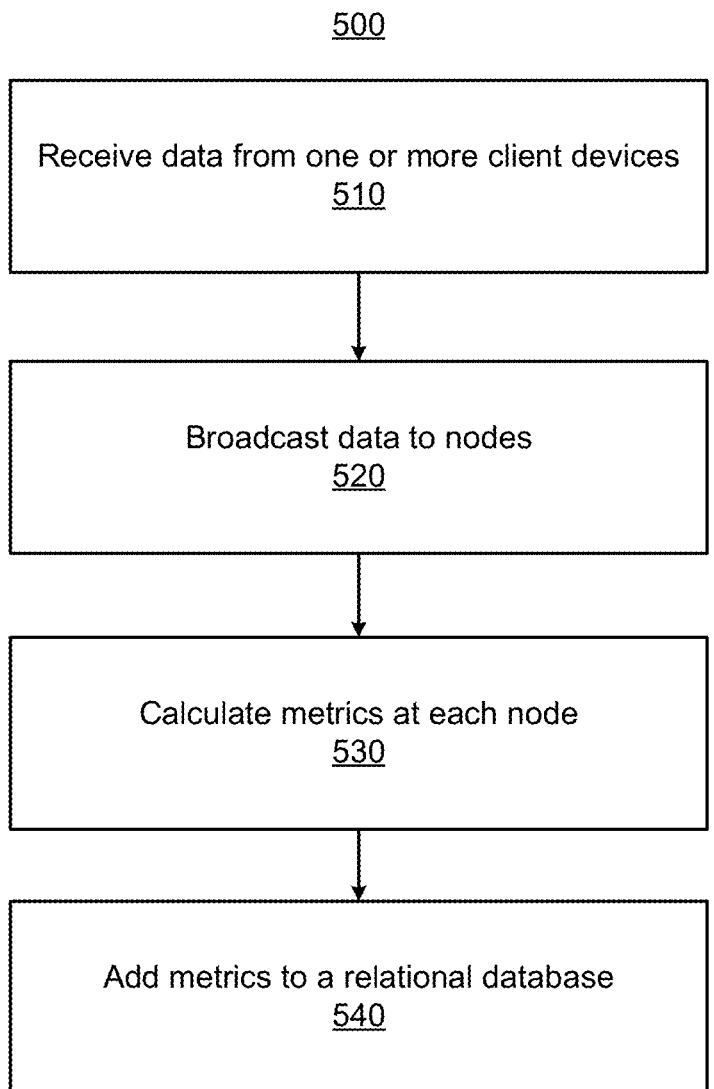
FIG. 5 is a flowchart of a process for adding metrics to a relational database, according to one embodiment.

FIG. 5 illustrates a method 500 for generating metrics and storing the metrics in a relational database, according to one embodiment. The steps of FIG. 5 are illustrated from the perspective of components of an anticheat server (e.g., 140) performing the method 500. However, some or all of the steps may be performed by other entities or components. In addition, some embodiments may perform the steps in parallel, perform the steps in different orders, or perform different steps. One or more steps of method 500 may be stored on a non-transitory computer-readable storage medium.

The anticheat server receives 510 data from one or more client devices 110 (e.g., the data receiving module 405 receives the data via a game server (e.g., 110)). In some embodiments, the anticheat server additionally or alternatively receives data from other servers or computing devices. A component of the anticheat server (e.g., the data receiving module 405) broadcasts 510 the data to one or more nodes (e.g., 410) of the anticheat server. The nodes may be in a predetermined set of nodes. The nodes 410 in the predetermined set may be preselected by the anticheat server 140 based on their availability to process data and/or a number of nodes 410 indicated by an external operator. In some embodiments, the number of nodes is selected by an external operator. Each node calculates 530 a portion of the data to generate one or more metrics. The metrics may indicate whether cheating behavior was detected in a portion of the data. Each node adds 540, upon completion of its individual generation of metrics, the one or more metrics to a relational database (e.g., 425) using prepared insert statements.

The process in FIG. 5 may be further described in relation to an example shared AR environment that is incorporated into a parallel reality game where the anticheat server analyzes data from client devices (e.g., 110) to determine whether the data is indicative of cheating behavior. Examples of cheating behavior in the parallel reality game may be when a player drives around in a car while playing the game instead of walking. A game server (e.g., 130) may receive data from a plurality of client devices actively providing the shared AR environment for the parallel reality game to players. The game server may send the data to the anticheat server, which uses the nodes to generate one or more metrics. A data receiving module (e.g., 405) of the anticheat server may broadcast the data to the nodes before the data receiving module receives all of the data from the game server. As previously stated, the nodes add the one or more metrics to the relational database. Each node adds its respective generated metric once the metric is generated rather than waiting for all other nodes to finish generating metrics. If one or more of the metrics are indicative of cheating behavior, the anticheat server may determine measures for the game server to take with respect to the player whose data was indicative of cheating behavior, such as to suspend or ban the player from the parallel reality game.

Example Computing System

Figure 6:
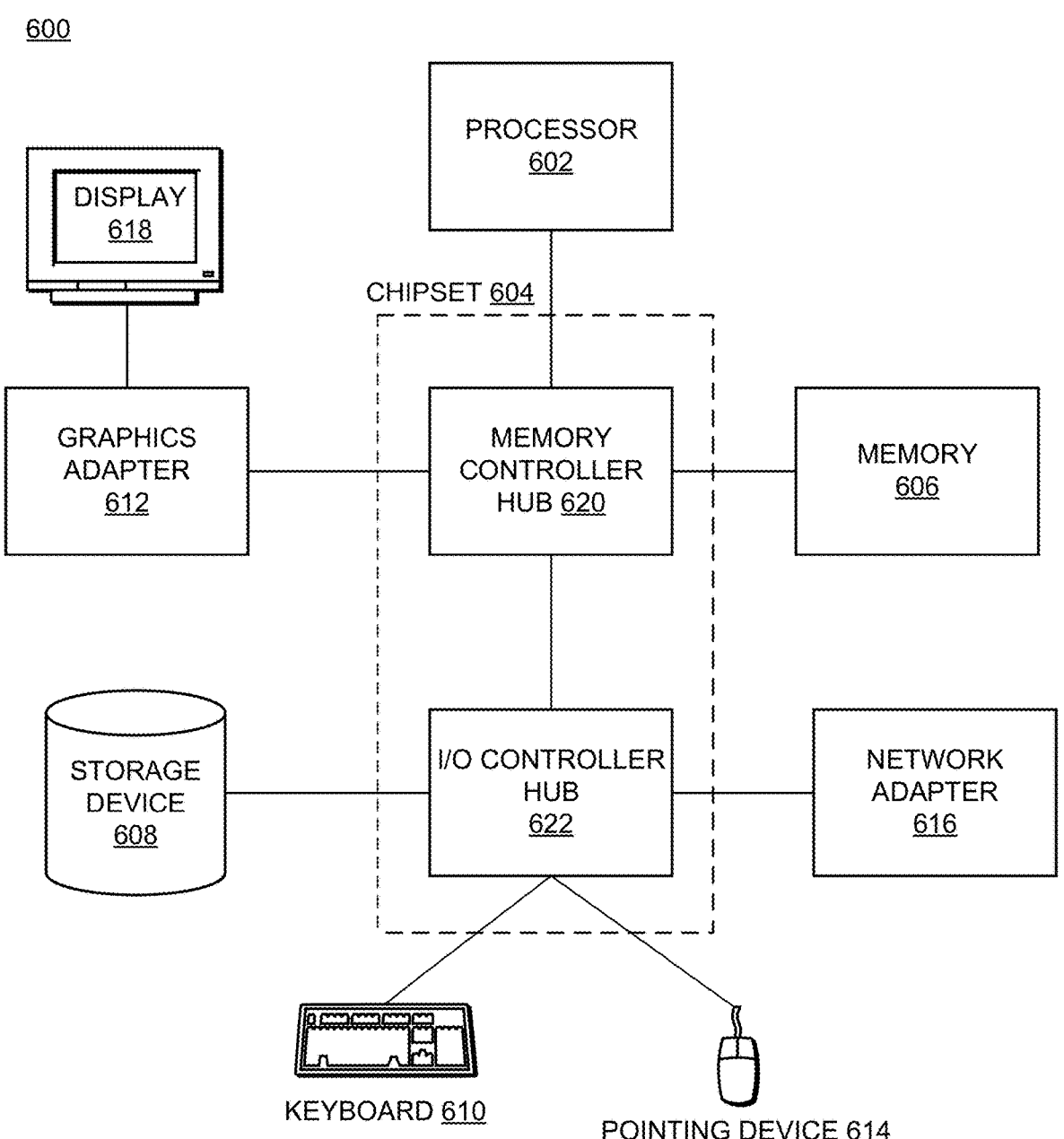
FIG. 6 illustrates an example computer system suitable for use in the networked computing environment of FIG. 1, according to one embodiment.

FIG. 6 is a block diagram of an example computer system 600 suitable for use as a client device 110 or game server 130. The example computer system 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer system 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and may be used in combination with the keyboard 610 (which may be an on-screen keyboard) to input data into the computer system 600. The graphics adapter 612 displays images and other information on the display 618. The network adapter 616 couples the computer system 600 to one or more computer networks, such as network 120.

The types of computers used by the entities of FIGS. 1-4 can vary depending upon the embodiment and the processing power required by the entity. For example, the game server 320 might include multiple blade servers working together to provide the functionality described. Furthermore, the computers can lack some of the components described above, such as keyboards 610, graphics adapters 612, and displays 618.

Example Location-Based Parallel Reality Game

FIG. 7 is a conceptual diagram of a virtual world 710 that parallels the real world 700. The virtual world 710 can act as the game board for players of a parallel reality game. As illustrated, the virtual world 710 includes a geography that parallels the geography of the real world 700. In particular, a range of coordinates defining a geographic area or space in the real world 700 is mapped to a corresponding range of coordinates defining a virtual space in the virtual world 710. The range of coordinates in the real world 700 can be associated with a town, neighborhood, city, campus, locale, a country, continent, the entire globe, or other geographic area. Each geographic coordinate in the range of geographic coordinates is mapped to a corresponding coordinate in a virtual space in the virtual world 710.

A player's position in the virtual world 710 corresponds to the player's position in the real world 700. For instance, player A located at position 712 in the real world 700 has a corresponding position 722 in the virtual world 710. Similarly, player B located at position 714 in the real world 700 has a corresponding position 724 in the virtual world 710. As the players move about in a range of geographic coordinates in the real world 700, the players also move about in the range of coordinates defining the virtual space in the virtual world 710. In particular, a positioning system (e.g., a GPS system, a localization system, or both) associated with a mobile computing device carried by the player can be used to track a player's position as the player navigates the range of geographic coordinates in the real world 700. Data associated with the player's position in the real world 700 is used to update the player's position in the corresponding range of coordinates defining the virtual space in the virtual world 710. In this manner, players can navigate along a continuous track in the range of coordinates defining the virtual space in the virtual world 710 by simply traveling among the corresponding range of geographic coordinates in the real world 700 without having to check in or periodically update location information at specific discrete locations in the real world 700.

The location-based game can include game objectives requiring players to travel to or interact with various virtual elements or virtual objects scattered at various virtual locations in the virtual world 710. A player can travel to these virtual locations by traveling to the corresponding location of the virtual elements or objects in the real world 700. For instance, a positioning system can track the position of the player such that as the player navigates the real world 700, the player also navigates the parallel virtual world 710. The player can then interact with various virtual elements and objects at the specific location to achieve or perform one or more game objectives.

A game objective may have players interacting with virtual elements 730 located at various virtual locations in the virtual world 710. These virtual elements 730 can be linked to landmarks, geographic locations, or objects 740 in the real world 700. The real-world landmarks or objects 740 can be works of art, monuments, buildings, businesses, libraries, museums, or other suitable real-world landmarks or objects. Interactions include capturing, claiming ownership of, using some virtual item, spending some virtual currency, etc. To capture these virtual elements 730, a player travels to the landmark or geographic locations 740 linked to the virtual elements 730 in the real world and performs any necessary interactions (as defined by the game's rules) with the virtual elements 730 in the virtual world 710. For example, player A 712 may have to travel to a landmark 740 in the real world 700 to interact with or capture a virtual element 730 linked with that particular landmark 740. The interaction with the virtual element 730 can require action in the real world, such as taking a photograph or verifying, obtaining, or capturing other information about the landmark or object 740 associated with the virtual element 730.

Game objectives may require that players use one or more virtual items that are collected by the players in the location-based game. For instance, the players may travel the virtual world 710 seeking virtual items 732 (e.g., weapons, creatures, power ups, or other items) that can be useful for completing game objectives. These virtual items 732 can be found or collected by traveling to different locations in the real world 700 or by completing various actions in either the virtual world 710 or the real world 700 (such as interacting with virtual elements 730, battling non-player characters or other players, or completing quests, etc.). In the example shown in FIG. 7, a player uses virtual items 732 to capture one or more virtual elements 730. In particular, a player can deploy virtual items 732 at locations in the virtual world 710 near to or within the virtual elements 730. Deploying one or more virtual items 732 in this manner can result in the capture of the virtual element 730 for the player or for the team/faction of the player.

In one particular implementation, a player may have to gather virtual energy as part of the parallel reality game. Virtual energy 750 can be scattered at different locations in the virtual world 710. A player can collect the virtual energy 750 by traveling to (or within a threshold distance of) the location in the real world 700 that corresponds to the location of the virtual energy in the virtual world 710. The virtual energy 750 can be used to power virtual items or perform various game objectives in the game. A player that loses all virtual energy 750 may be disconnected from the game or prevented from playing for a certain amount of time or until they have collected additional virtual energy 750.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

FIG. 8 depicts one embodiment of a game interface 800 that can be presented (e.g., on a player's smartphone) as part of the interface between the player and the virtual world 710. The game interface 800 includes a display window 810 that can be used to display the virtual world 710 and various other aspects of the game, such as player position 722 and the locations of virtual elements 730, virtual items 732, and virtual energy 750 in the virtual world 710. The user interface 800 can also display other information, such as game data information, game communications, player information, client location verification instructions and other information associated with the game. For example, the user interface can display player information 815, such as player name, experience level, and other information. The user interface 800 can include a menu 820 for accessing various game settings and other information associated with the game. The user interface 800 can also include a communications interface 830 that enables communications between the game system and the player and between one or more players of the parallel reality game.

According to aspects of the present disclosure, a player can interact with the parallel reality game by carrying a client device 110 around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 800 can include non-visual elements that allow a user to interact with the game. For instance, the game interface can provide audible notifications to the player when the player is approaching a virtual element or object in the game or when an important event happens in the parallel reality game. In some embodiments, a player can control these audible notifications with audio control 840. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A method comprising:

receiving a batch of data generated by one or more client devices;

generating portions of the batch of data;

identifying nodes to receive the portions of the batch of data based on nodes' availability to process data, each node being an independent processing unit;

broadcasting the portions of the data to the nodes, wherein broadcasting the portions of the data begins prior to receiving the entire batch of data;

generating, by the nodes, metrics based on the received portions of the data; and adding, by the nodes, the metrics generated by the nodes to a relational database that is unable to add all of the metrics generated by the nodes at once, wherein one or more metrics generated by each node are added to the relational database independent of the other nodes.

2. The method of claim 1, wherein at least one node uses prepared insert statements to add the one or more metrics to the relational database.

3. The method of claim 1, wherein the relational database is part of a server and at least one node of the nodes is external to the server.

4. The method of claim 1, wherein the nodes are configured to calculate the received portions of the data in parallel.

5. The method of claim 1, wherein the relational database is unable to add all of the metrics generated by the nodes at once due to a dataflow rate limit that prohibits all of the metrics generated by the nodes from being added at the same time.

6. The method of claim 1, further comprising: receiving, by accumulation layers of the nodes, the portions of the data, wherein a threshold of each accumulation layer depends on at least one of: a type of data being received or the metrics to be generated by the nodes.

7. The method of claim 1, wherein generating the portions of the batch of data comprises using a hash function to aggregate types of data.

8. The method of claim 1, wherein at least one of the metrics generated by the nodes includes a time stamp based on when the corresponding portion of data was generated.

9. The method of claim 1, wherein receiving the batch of data comprises:

accessing a compressed data storage system via a range scan.

10. The method of claim 1, wherein the relational database is a PostgreSQL relational database.

11. A non-transitory computer-readable storage medium comprising stored instructions that, when executed by a computing device, cause the computing device to perform operations including:

receiving a batch of data generated by one or more client devices;

generating portions of the batch of data;

identifying nodes to receive the portions of the batch of data based on nodes' availability to process data, each node being an independent processing unit;

broadcasting the portions of the data to the nodes, wherein broadcasting the portions of the data begins prior to receiving the entire batch of data;

generating, by the nodes, metrics based on the received portions of the data; and adding, by the nodes, the metrics generated by the nodes to a relational database that is unable to add all of the metrics generated by the nodes at once, wherein one or more metrics generated by each node are added to the relational database independent of the other nodes.

12. The non-transitory computer-readable storage medium of claim 11, wherein at least one node uses prepared insert statements to add the one or more metrics to the relational database.

13. The non-transitory computer-readable storage medium of claim 11, wherein the relational database is part of a server and at least one node of the nodes is external to the server.

14. The non-transitory computer-readable storage medium of claim 11, wherein the nodes are configured to calculate the received portions of the data in parallel.

15. The non-transitory computer-readable storage medium of claim 11, wherein the relational database is unable to add all of the metrics generated by the nodes at once due to a dataflow rate limit that prohibits all of the metrics generated by the nodes from being added at the same time.

16. The non-transitory computer-readable storage medium of claim 11, further comprising: receiving, by accumulation layers of the nodes, the portions of the data, wherein a threshold of each accumulation layer depends on at least one of: a type of data being received or the metrics to be generated by the nodes.

17. The non-transitory computer-readable storage medium of claim 11, wherein generating the portions of the batch of data comprises using a hash function to aggregate types of data.

18. The non-transitory computer-readable storage medium of claim 11, wherein at least one of the metrics generated by the nodes includes a time stamp based on when the corresponding portion of data was generated.

19. The non-transitory computer-readable storage medium of claim 11, wherein receiving the batch of data comprises: accessing a compressed data storage system via a range scan.

20. A server configured to perform operations comprising:

receiving a batch of data generated by one or more client devices;

generating portions of the batch of data;

identifying nodes to receive the portions of the batch of data based on nodes' availability to process data, each node being an independent processing unit;

broadcasting the portions of the data to the nodes, wherein broadcasting the portions of the data begins prior to receiving the entire batch of data;

generating, by the nodes, metrics based on the received portions of the data; and adding, by the nodes, the metrics generated by the nodes to a relational database that is unable to add all of the metrics generated by the nodes at once, wherein one or more metrics generated by each node are added to the relational database independent of the other nodes.

* * * * *